Patented Feb. 25, 1936

2,031,787

UNITED STATES PATENT OFFICE 2,031,787

SULPHURIC ACID CONTACT PROCESS

John H. Perry and Earl S. Ridler, Shaker Heights, Ohio, assignors to The Grasselli Chemical Company, Cleveland, Ohio, a corporation of Delaware No Drawing. Application November 30, 1934, Serial No. 755,354

4 Claims. (Cl. 23—175)

The present invention relates to contact processes for manufacturing sulphuric acid in which a catalyst of the type is used in which platinum is deposited upon a magnesium sulphate carrier, or support, and consists in the employment of a carrier for the platinum in which magnesium sulphate is associated with aluminum sulphate and another carrier promoter.

It has been shown in U. S. Patents 1,914,458 and 1,914,835 that the efficiency of a catalyst comprising platinum deposited upon a magnesium sulphate carrier can be greatly improved and rendered more resistant to heat inactivation; and its sensitiveness to poisons, such as alkali metals, decreased, if a salt of another metal such as of the alkaline earth metals, iron, thorium, tantalum and cerium is associated with the magnesium sulphate. For lack of explanation of this effect the expression "carrier promoters" has been used for the metal salts which, when added to the magnesium sulphate, improve the efficiency of the catalyst.

It is shown in an application by one of us (J. H. Perry) Ser. No. 755,353, filed concurrently herewith, that aluminum sulphate, when admixed with magnesium sulphate, considerably improves the efficiency of platinum deposited on such a carrier.

We have found that the beneficial effect of aluminum sulphate can be further improved if another carrier promoter is added in addition to aluminum sulphate to the magnesium sulphate, and an iron salt is particularly efficient as the third component in a ternary carrier.

We have found that in such ternary magnesium—aluminum—iron sulphate carriers the amount of aluminum and iron sulphates present in the carrier is not particularly critical. We have found, however, that it is preferable to use a predominating amount of magnesium sulphate. Excellent catalysts are produced, for instance, from carriers containing about 75% magnesium sulphate when the remaining 25% is composed of iron and aluminum sulphates with aluminum sulphate present in an amount of 10-15% of the total and the iron sulphate from 15 to 10%, and in general we prefer that the ternary carriers should not contain more than 30% aluminum sulphate and 12% ferric sulphate, though valuable results are also obtainable with any proportions of magnesium—aluminum and ferric sulphates.

The preparation of my novel catalysts follows the general processes of making platinized magnesium sulphate catalysts and the following procedure is given for illustrative purposes only.

Predetermined proportions of crystalline magnesium sulphate, aluminum sulphate and ferric sulphate are thoroughly mixed. The mixture is then heated to drive off the moisture. This is usually done by heating for four hours to a temperature of 450–500° C.; the cake formed is then broken up and again heated for three hours to from 500–550° C. This usually gives a product containing about 1% moisture.

This product is then, if desired, shaped or formed, or used in loose granular form and is ready for impregnation. The product is then sprayed with a solution of platinic chloride containing sugar or other reducing agent so as to contain a definite amount of platinum (for instance 0.3%). On heating the platinum chloride is reduced and finely divided platinum is deposited on the carrier.

Instead of using aluminum and ferric sulphate to mix with the magnesium sulphate, we can use other aluminum or iron salts as these will in the sulphuric acid converter be transformed into the sulphates but in order to obtain a carrier of physical ruggedness it is preferable to start immediately with the sulphate.

It is also preferable to use materials containing as little alkali metal salts as possible.

The aluminum sulphate and iron sulphate may be added separately or jointly at any stage of producing the carrier, namely—before, during or after the first calcining step, but care must be taken that the aluminum and iron sulphates are well blended throughout the mass of magnesium sulphate.

Prepared in this manner our novel catalysts have platinum deposited on the magnesium—aluminum—iron sulphate carrier.

These catalysts when compared with catalysts on a pure magnesium sulphate or a pure aluminum sulphate carrier show the following beneficial properties:

(1) Greater life at maximum activity.
(2) Greater resistance to thermal inactivation.
(3) Greater resistance to the deteriorating and inactivating effect of alkalies.
(4) Higher rating at a given conversion temperature.
(5) Greater low temperature activity.
(6) Greater initial activity.

Our novel catalysts are used in substantially the same manner and at the same temperatures as platinized magnesium sulphate catalysts except that they have the advantages enumerated above.

It takes quite some time to prove these advantages in factory practice. It was, however, found that the properties can be determined in an accelerated efficiency test which was carried out as follows:

100 c.c. of the platinized carrier were placed in an experimental converter. A mixture of 8% $SO_2$—92% air was passed over the catalyst at a space velocity of 1800 that is to say, 1800 volumes of the gas were passed through one volume unit of catalyst per hour. The per cent conversion of $SO_2$ to $SO_3$ was determined at an exit temperature of 420° C. The temperature was then raised to 650° C. and the catalyst was held at this temperature for from 72 to 80 hours. After this the per cent conversion at 420° C. was again determined. The final conversion was a measure of the resistance to thermal inactivation.

Results obtained with catalysts of different composition of the carrier and a platinum content of 0.3% are tabulated as follows:

| Composition of carrier | $MgSO_4$% | 100 | 85.0 | 60.0 | 75.0 | 70.0 | |
|---|---|---|---|---|---|---|---|
| | $Al_2(SO_4)_3$% | | 10.0 | 30.0 | 20.0 | 20.0 | |
| | $Fe_2(SO_4)_3$% | | 5.0 | 10.0 | 5.0 | 10.0 | 100 |
| Original conversion at 420° C. in percentage | | 97.0 | 97.0 | 97.6 | 97.3 | 97.2 | 96.4 |
| Conversion at 420° C. after heating at 650° C. in percentage | | 85.0 | 96.5 | 96.3 | 96.3 | 96.6 | 71.5 |

The resistivity of the ternary platinized magnesium—aluminum—iron sulphate carrier—catalysts is particularly pronounced at high space velocities, i. e. as used in a first converter of a multiconverter contact plant. Such first converters are subject to greater temperature variations and as they carry the greater burden of conversion it is essential that the catalyst does not materially lose its efficiency as the result of over heating and that it maintains its efficiency at relatively low temperature. In other words, the catalyst should be efficient over a wide range of temperatures.

The efficiency of a platinized magnesium—aluminum—iron sulphate catalyst at high space velocity has, for instance, been shown as follows.

The space velocity in this case was 6000 that is to say, 6000 volumes of the gas were passed through one volume unit of catalyst per hour.

| Composition of carrier | $MgSO_4$% | | 99.0% | 75.0% |
|---|---|---|---|---|
| | $Al_2(SO_4)_3$% | | | 15.0 |
| | $Fe_2(SO_4)_3$% | | 1.0 | 10.0 |
| Original conversion at— | °C 320 | 85 | 85 | |
| | 340 | 85 | 85 | |
| Conversion after heating for 24 hours at 650° C. | 340 | 30 | 80 | |
| | 360 | 30 | 80 | |
| | 380 | 73 | 80 | |
| | 400 | 74 | 79 | |
| | 420 | 74 | 78 | |

Catalysts of this type may be used with less purification of the gases than is normally required or may be operated for short periods of time without the usual efficiency obtained in the ordinary purification systems.

In other words our novel catalysts are also more resistant to poisonous impurities contained in the burner gases than platinized magnesium sulphate catalysts.

We claim:

1. A catalyst for use in a contact sulphuric acid process comprising platinum deposited upon a magnesium sulphate—aluminum sulphate—iron sulphate carrier.

2. A catalyst for use in a contact sulphuric acid process consisting of platinum deposited upon a carrier consisting of substantially 75% magnesium sulphate with the balance being aluminum sulphate and iron sulphate.

3. A catalyst for use in the contact sulphuric acid process consisting of platinum deposited upon a carrier consisting of substantially 75% magnesium sulphate with from 10–15% aluminum sulphate and 15–10% ferric sulphate.

4. In a contact sulphuric acid process the step of passing sulphur dioxide and air at a reactive temperature over a catalyst comprising platinum deposited upon a carrier consisting predominantly of magnesium sulphate with lesser amounts of aluminum sulphate and ferric sulphates.

JOHN H. PERRY.
EARL S. RIDLER.